US006931123B1

(12) United States Patent
Hughes

(10) Patent No.: US 6,931,123 B1
(45) Date of Patent: Aug. 16, 2005

(54) ECHO CANCELLATION

(75) Inventor: Peter James Hughes, Woodbridge (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/623,979

(22) PCT Filed: Apr. 7, 1999

(86) PCT No.: PCT/GB99/01062

§ 371 (c)(1),
(2), (4) Date: Sep. 11, 2000

(87) PCT Pub. No.: WO99/53674

PCT Pub. Date: Oct. 21, 1999

(30) Foreign Application Priority Data

Apr. 8, 1998 (EP) .................................. 98302763
Apr. 8, 1998 (GB) .................................. 9807745

(51) Int. Cl.[7] .......................... H04M 1/00; H04M 9/00; H04B 15/00
(52) U.S. Cl. .......................... 379/406.01; 379/406.06; 379/406.08; 379/417; 381/93; 381/94.1
(58) Field of Search ................ 379/406.01, 406.08, 379/406.06, 406.02, 392.01, 406.05, 406.12, 379/406.13, 406.14, 391, 388.07, 417; 381/80, 381/99, 94.1, 93, 11, 13, 82, 83, 92, 95; 370/286, 370/287, 289, 290, 291, 292; 455/570

(56) References Cited

U.S. PATENT DOCUMENTS

| | | | | |
|---|---|---|---|---|
| 4,956,867 A | * | 9/1990 | Zurek et al. | 381/94.1 |
| 5,363,441 A | * | 11/1994 | Feiner et al. | 379/406.01 |
| 5,425,059 A | * | 6/1995 | Tsujimoto | 379/406.01 |
| 5,555,310 A | * | 9/1996 | Minami et al. | 381/17 |
| 5,848,146 A | * | 12/1998 | Slattery | 379/390 |
| 5,960,077 A | * | 9/1999 | Ishii et al. | 379/406.01 |
| 6,246,760 B1 | * | 6/2001 | Makino et al. | 379/410 |
| 6,256,394 B1 | * | 7/2001 | Deville et al. | 381/94.7 |
| 6,442,272 B1 | * | 8/2002 | Osovets | 379/406.01 |
| 6,556,682 B1 | * | 4/2003 | Gilloire et al. | 379/406.01 |
| 6,611,603 B1 | * | 8/2003 | Norris et al. | 381/309 |

FOREIGN PATENT DOCUMENTS

GB    WO 99/53673    * 10/1999

* cited by examiner

Primary Examiner—Rexford Barnie
(74) Attorney, Agent, or Firm—Nixon & Vanderhye P.C.

(57) ABSTRACT

An audio conferencing system in which each participant in the conference generates a monaural signal for transmission on an output channel to the other participants, and receives a plurality of input channels from the other participants. The input channels are individually converted to stereophonic signal pairs by respective filter banks having selected predetermined transfer functions. The stereo channels are combined linearly to provide a stereophonic audio output. The system has an echo cancellation system in which an adaptive filter process is applied to the input channels to generate a combined echo cancellation signal for applying to the output channel.

16 Claims, 8 Drawing Sheets

ECHO CANCELLATION

BACKGROUND OF THE INVENTION

1. Field of the Invention

This invention relates to echo cancellation, in particular for use in spatialised audio systems such as are used in videoconference systems, that is, systems in which two or more users at different locations participate in a conversation using audiovisual telecommunications systems. At present most systems use a wideband monophonic audio system with the sound reproduced using either an internal loudspeaker fitted to the vision monitor, or an auxiliary hi-fi loudspeaker. This provides good quality audio, but there is no method of co-locating the video and sound images. For a small Visual Display Unit this is not a problem, but as the move to more lifelike and immersive environments continues it will be necessary to have spatialised sound.

2. Description of Related Art

In any two-way audio system, in which sound is travelling both to and from the same user there is a problem of acoustic feedback or "echo" between the loudspeaker of the input channel and the microphone of the output channel. As shown in FIG. 1, which shows a simple mono system, echo occurs when there is an acoustic path between the loudspeaker (22) and the microphone (12) in Room "B" as represented by h1(t) in FIG. 1. The talker 31 in room 'A' hears an echo of his own voice which passes from the microphone 11 in Room "A", the outward channel 41, the loudspeaker 22, in Room "B", the acoustic path h1(t), the microphone 12 in Room "B", the return channel 42 and the loudspeaker 21 in Room "A". The listener 32 in room 'B' also hears an echo of the talker 31, having passed through the path described above, and then through the acoustic paths h2(t) between the loudspeaker 21 and microphone 11 in Room "A" to pass a second time over the outward channel 41 to the loudspeaker 22 in Room "B". These are called 'talker echo' and 'listener echo' respectively.

Depending on their size and time delays, echoes may be anything from unnoticeable to a devastating impairment resulting in instability and howling.

The creation of echo may be avoided by the use of body-mounted devices. Headphones can be used to isolate the incoming sound from the microphone. Alternatively, "close" microphones (e.g. clipped to the user's clothing), can also be used. These have a sensitivity which falls off rapidly with distance, so that the wearer's voice is detected clearly whilst signals emanating from a loudspeaker some distance away are only detected at a low volume. However, body-mounted devices are not always practical, and are inconvenient for the user to use, and require each user at a given location to be provided for individually.

In situations where the creation of echo cannot be avoided, some form of echo control or cancellation is desirable, to avoid the echo signal returning to the source of the original signal. A simple form of echo control, called echo suppression, is illustrated in FIG. 2. Echoes are prevented by only allowing signal transmission if the person in the room is speaking. Switches 51, 52, or variable attenuators in more sophisticated systems, are controlled by analysing the send and receive signals 41, 42 and using a decision algorithm to determine when transmission is permitted. This is a very effective echo control method, but can be very intrusive. Double talk, i.e. both parties talking at the same time, is not possible.

The principle behind echo cancellation may be seen from FIG. 3. The echo signal in the return path 42, represented by d(t), is caused by the acoustic path between loudspeaker and microphone. Cancellation is achieved in a canceller 62 by creating a synthetic model ĥ(t) of the signal path such that the echo may be removed by subtraction in a combiner 90 in the return path 42. The signal e(t) is now free of echoes, containing only sounds that originated in room B. The modelling of ĥ(t) is usually achieved by adaptation techniques which drives e(t) towards zero, the simplest and commonest being called the 'least mean squares' (LMS) algorithm. Its drawback is that the time taken to adapt is dependent on the signal characteristics. Other algorithms such as the 'recursive least squares' (RLS), or 'affine projection' (AP) give better performance but greatly increased processing requirements.

Monophonic echo cancellation is a mature technology, and widely used in telecommunications—loud-speaking telephones, teleconference systems, network echo control and data transmission are good examples. For "artificial" spatialised sound systems, in which a mono signal is reproduced in two or more loudspeakers, manipulated linearly in gain and delay to seem to originate from the required direction, monophonic echo cancellation techniques can be used. However, 'real' spatial sound, in which a multichannel signal is transmitted and the sending room characteristics are recreated in the receiving room, presents fundamental echo cancellation problems.

For multiple channel echo cancellation the number of echo paths is the product of the number of microphones and the number of loudspeakers in room B, as shown in FIG. 4 for a system with two of each. FIG. 4 shows the echo adaptation units 62L, 62R associated with each of two input channels 41L, 41R for a microphone 12R, whose outputs are combined in a combiner unit 91 to provide a cancellation signal ĥ(t). Note that further adaptation units will be required for the other path 42L (not shown) associated with the other microphone 12L.

The problem may thus be seen as one of characterising an unknown system having several inputs ($g_L(t)$, $g_R(t)$) for each output ĥ(t). The result is that adaptation algorithms can only converge to a correct solution if $x_L(t)$ and $x_R(t)$ are completely independent. This is unlikely for a stereo (or multichannel) signal in which the original sources are associated. One approach for a motionless source is to assume that one channel may be derived from the other, allowing a single channel echo canceller 62 to model both echo paths $h_L(t)$, $h_R(t)$. This is illustrated in FIG. 5. Causality is maintained by a selector 60 taking the canceller input from the channel ($g_L(t)$ or $g_R(t)$) with less delay. The drawback here is that the canceller 62 is now modelling both h(t) and g(t). If the source moves, or a different speaker starts talking, g(t) will change (the relative gains and delays of $g_L(t)$ and $g_R(t)$), requiring re-adaptation. It also assumes both channels of g(t) have stable inverses.

Another approach is to try to reduce the cross correlation between channels. This must be done without degrading the audio quality or stereo image. Several methods have been tried. Adding independent noise sources to each channel has been proposed, but the noise is audible. Frequency-shifting one channel relative to the other disturbs the stereo image. Decorrelating filters have also been tried, but adequate decorrelation cannot be obtained. Adding non-linear distortion has been claimed to be inaudible due to psycho-acoustic masking effects. The use of interleaving Comb filters, in which at any given frequency only one channel contains energy is also reported to work, but performance is poor below 1 kHz.

Unless the decorrelation is very good a fast adaptation algorithm such as stereo fast RLS (recursive least squares) will be required. These are computationally very expensive, requiring the order of 28 multiplications and 28 additions for each filter coefficient. For example, a 75 ms stereo fast RLS echo canceller sampling at 16 kHz requires more than $10^9$ multiplications per second. Since even the most modern DSP devices (e.g. Texas TMS320C6X) only just manage $2\times10^8$ multiplications per second.

SUMMARY OF THE INVENTION

According to the invention, there is provided a method of echo cancellation for an audio conferencing system in which a participant in the conference generates a monaural signal for transmission on an output channel to the other participants, and receives a monaural input channel from each of the other participants, the input channels being combined linearly to provide a spatialised audio output comprising a plurality of audio channels, characterised in that an adaptive filter process is applied to the input channels to generate a combined echo cancellation signal for applying to the output channel.

According to another aspect, there is provided echo cancellation apparatus for an audio conferencing system having a monaural output channel and a plurality of monaural input channels, the input channels being combined linearly to provide a spatialised audio output comprising a plurality of audio channels, characterised in that an adaptive filter is applied to the input channels for generating an echo cancellation signal for applying to the output channel.

Because a linear spatialisation technique is used, the output from each loudspeaker of the spatialised output is a linear combination of the inputs. This is true for the echo component as well as for the complete signal. Since the input channels are independent, the individual echo components are uncorrelated, and each one can be identified by an adaptive filter dedicated to that input channel. The correlation problems already discussed with reference to FIG. 4 are therefore not encountered in this system.

A separate adaptive filter may be provided for each input channel, the outputs of the filters being combined to form the cancellation signal. These filters may be monophonic, but in an arrangement in which the input signals are individually converted to spatialised signal sets (for example stereophonic signal pairs) by respective predetermined transfer functions, the adaptive filters may be mutiple channel (for example stereo) filters, correlations between the spatialised signal sets being allowed for using an adaptation process driven by data relating to each transfer function. This allows adaptation to changes in the spatialisation functions.

In a variant of this arrangement, one multiple channel adaptive filter is applied to the combined input channel set to generate an echo cancellation signal for applying to the output channel, correlations between the spatialised signal set being allowed for using an adaptation process based on data relating to the predetermined transfer functions (81, 82, 83).

The embodiment to be described in detail uses a transaural stereo spatialisation process, but the invention is also applicable to panned and ambisonic transfer functions, having two or more loudspeakers.

BRIEF SUMMARY OF THE DRAWINGS

Three embodiments of an echo cancellation system according to the invention will now be described, by way of example, with reference to the Figures, and in particular FIGS. 6, 7 and 8.

DETAILED DESCRIPTION OF EXEMPLARY EMBODIMENTS

Figure 1:
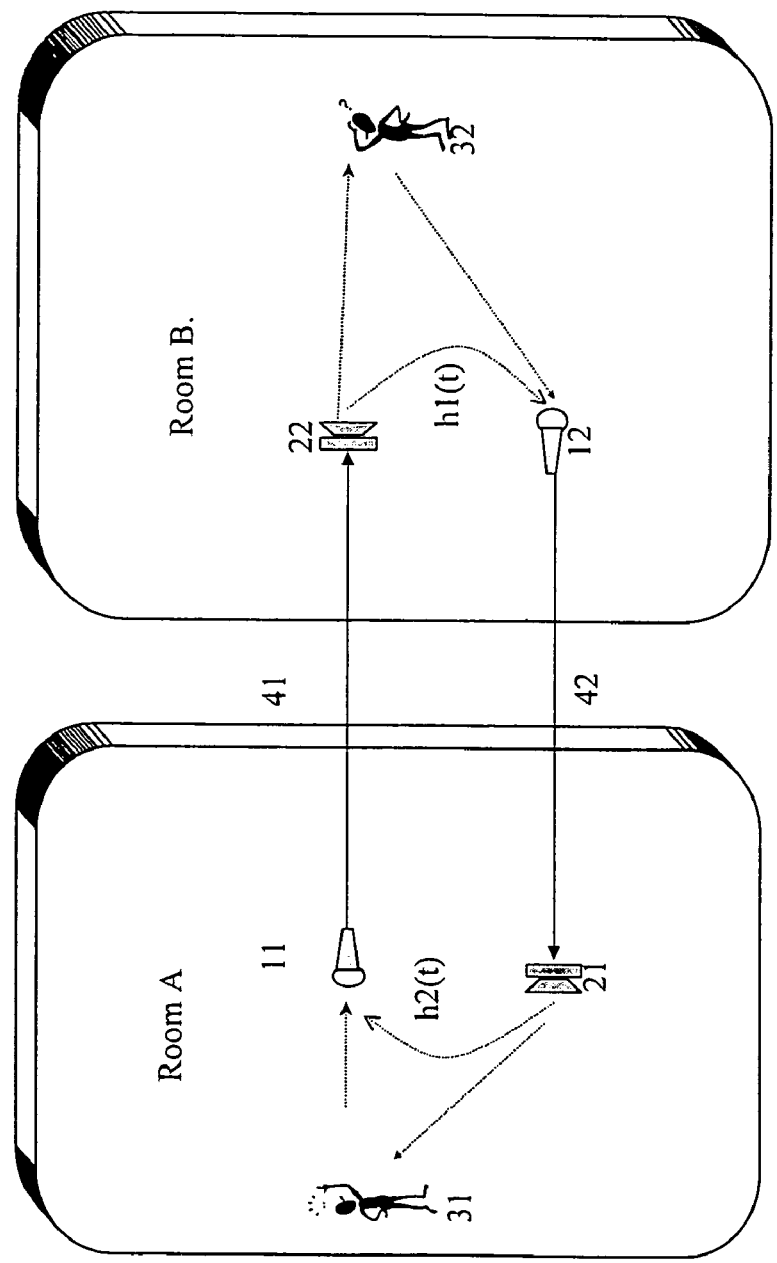
FIG. 1 is a schematic representation of the generation of acoustic feedback, or "echo"
Figure 2:
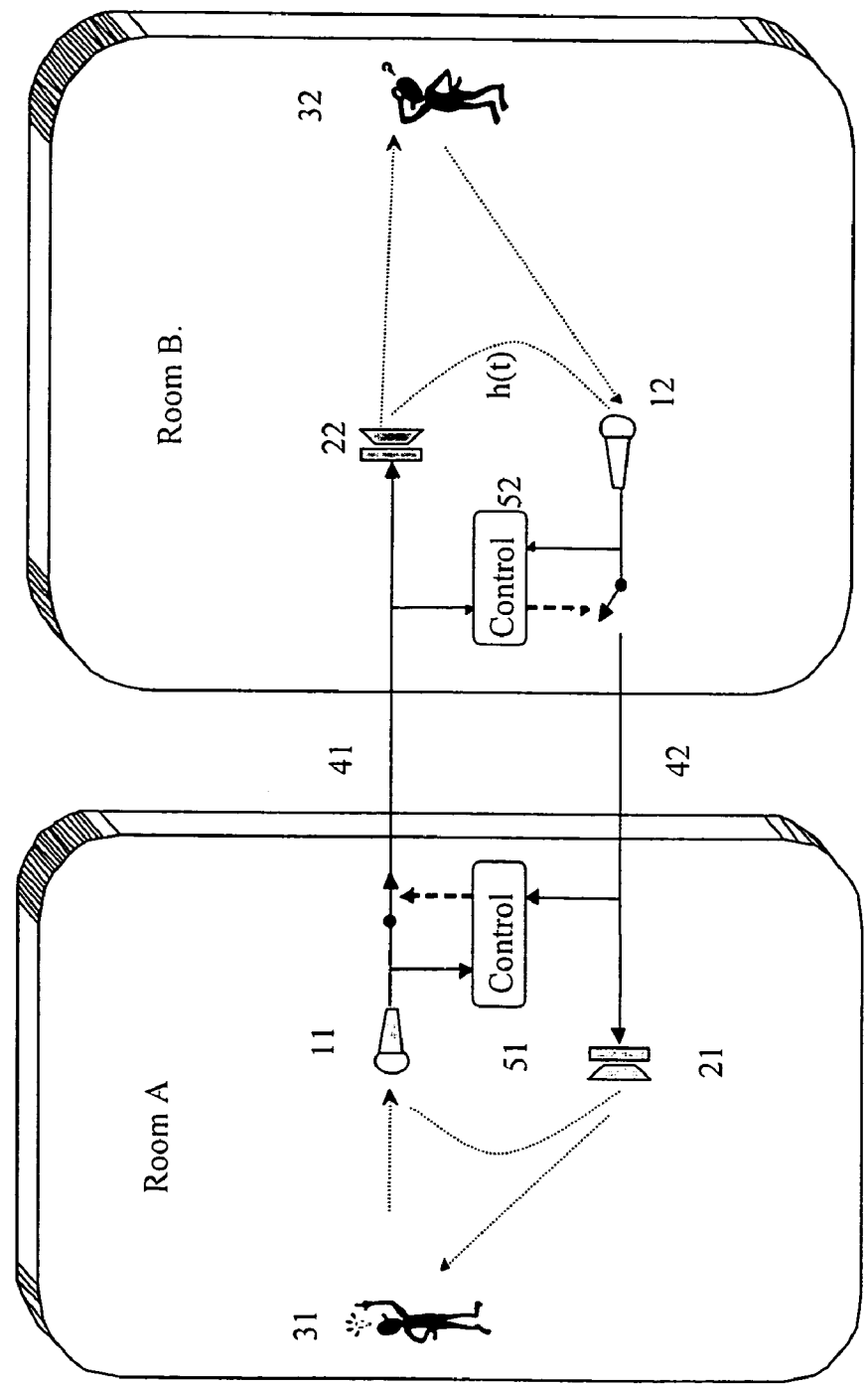
FIG. 2 is a schematic representation of a simple echo suppression system.
Figure 3:
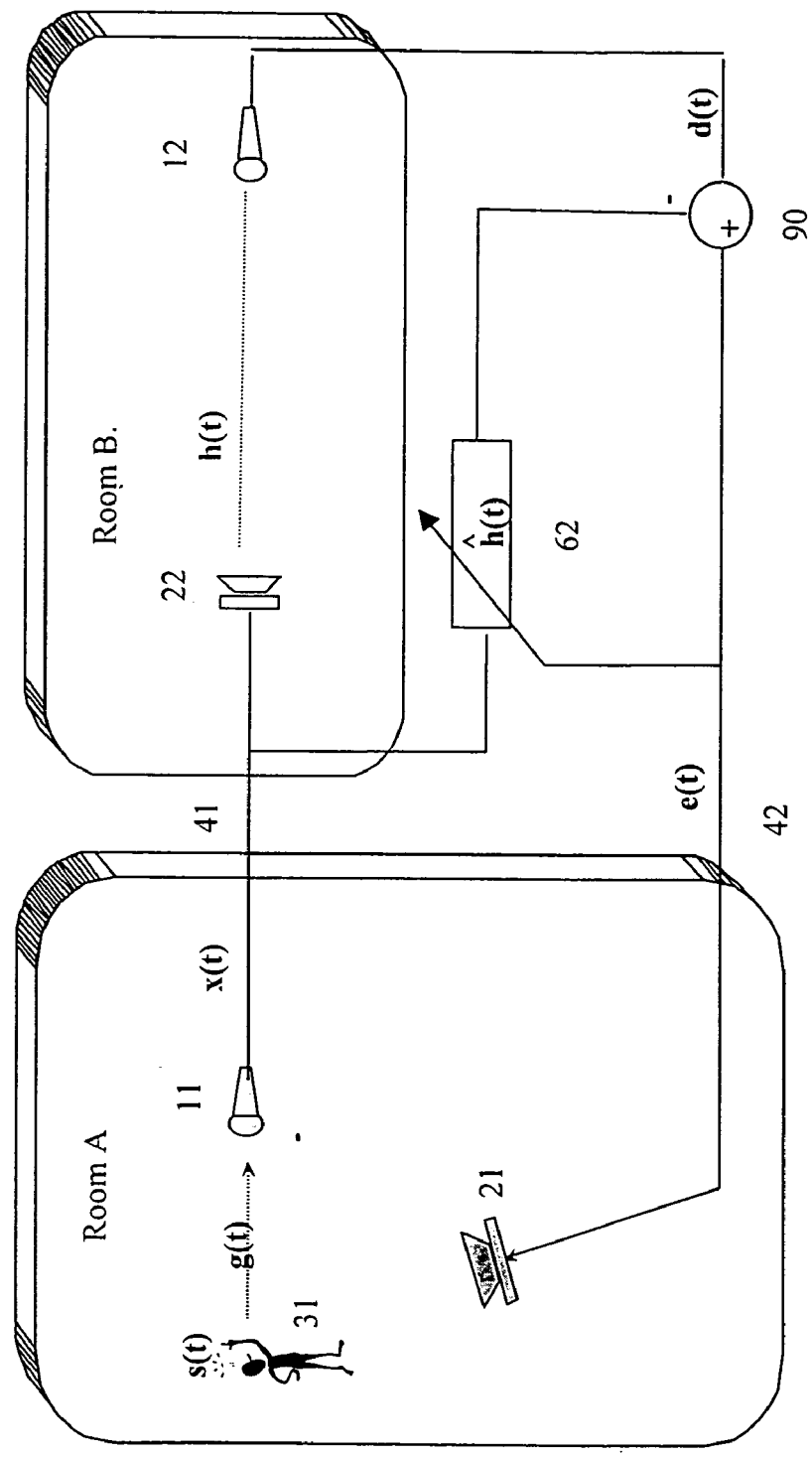
FIG. 3 is a schematic representation of a simple monophonic echo cancellation system.
Figure 4:
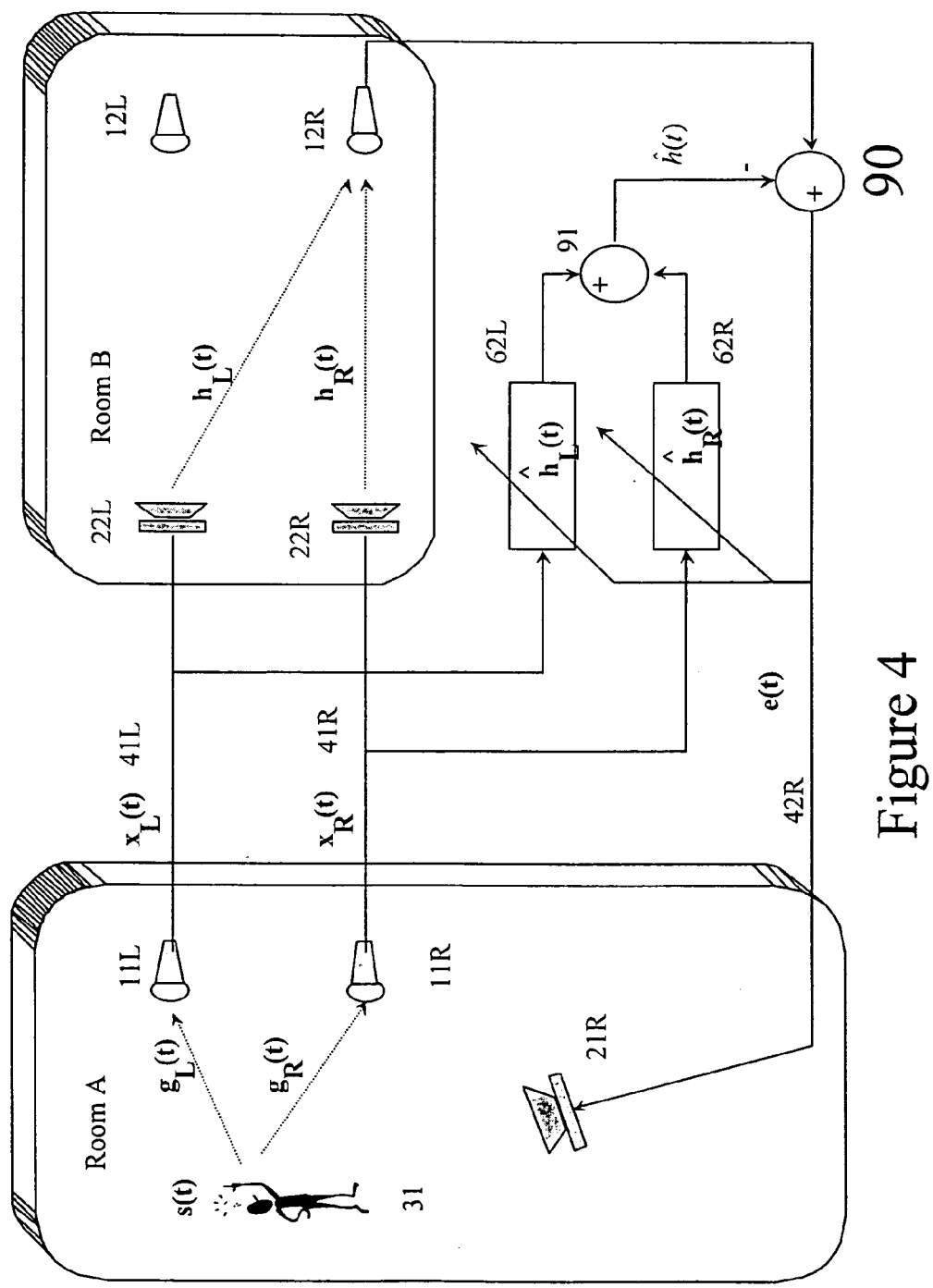
FIG. 4 is a schematic representation of a simple stereophonic echo cancellation system.
Figure 5:
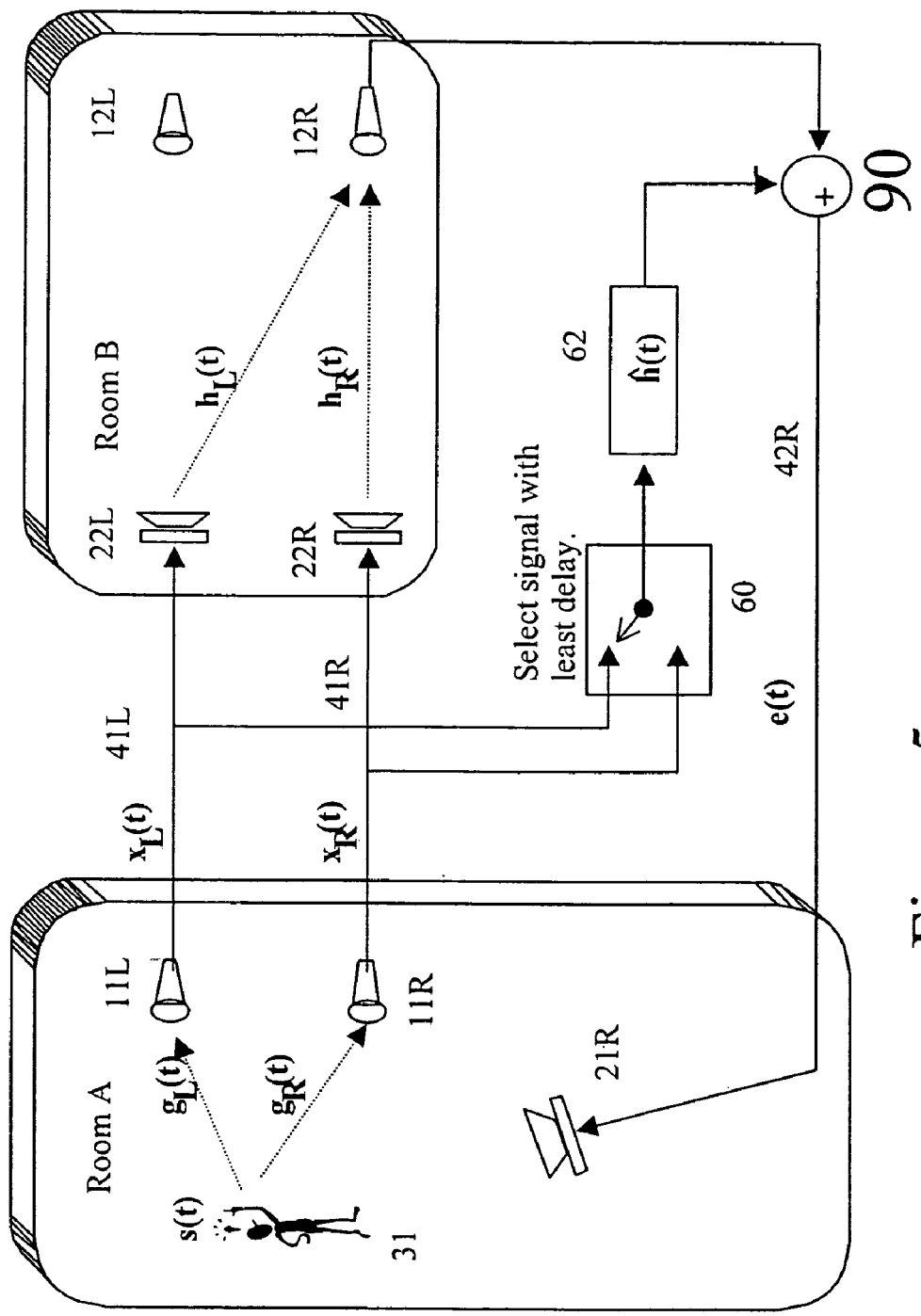
FIG. 5 is a schematic representation of another stereophonic echo cancellation system.
Figure 6:
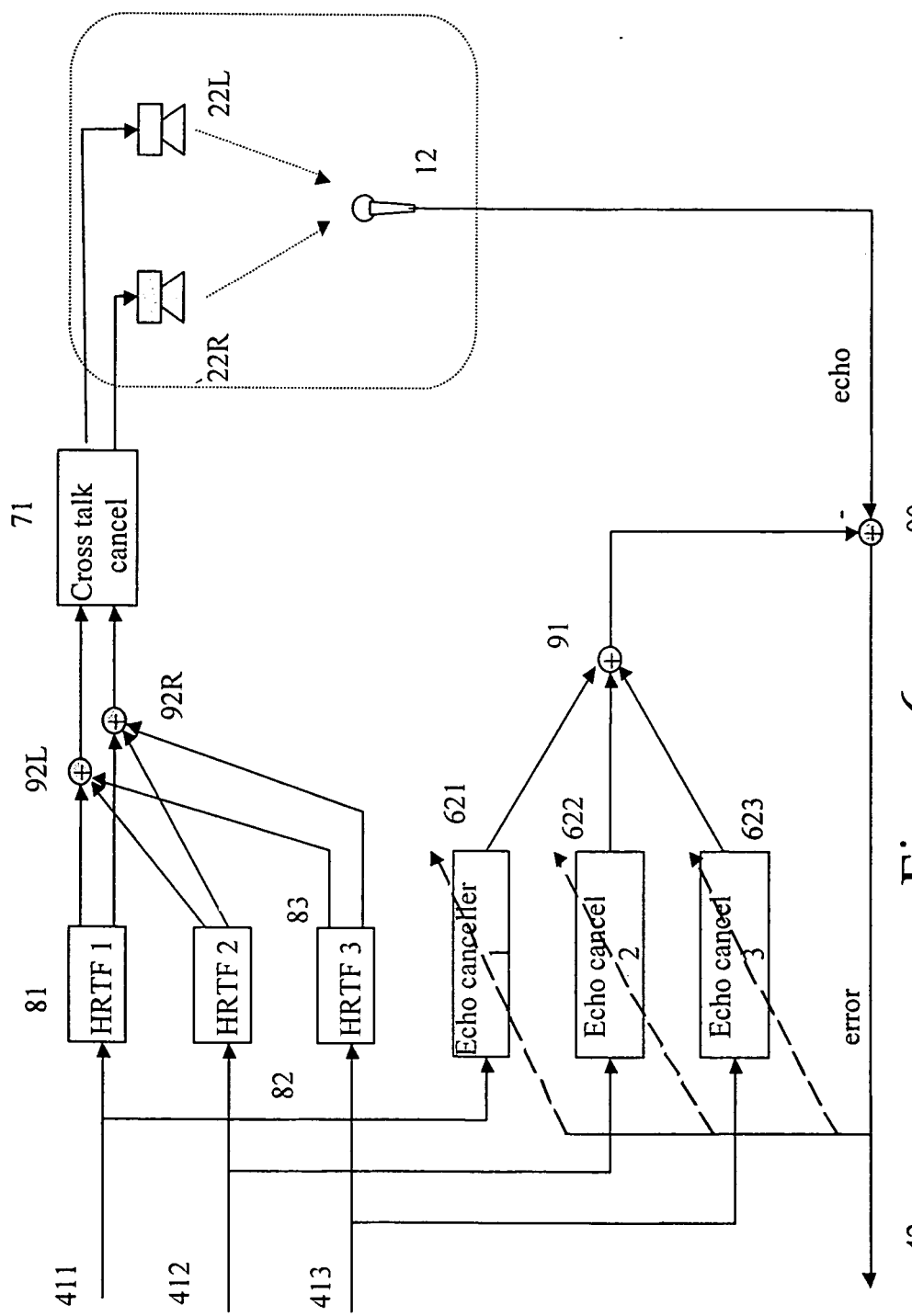
FIG. 6 is a schematic representation of a first echo cancellation system according to the invention.
Figure 7:
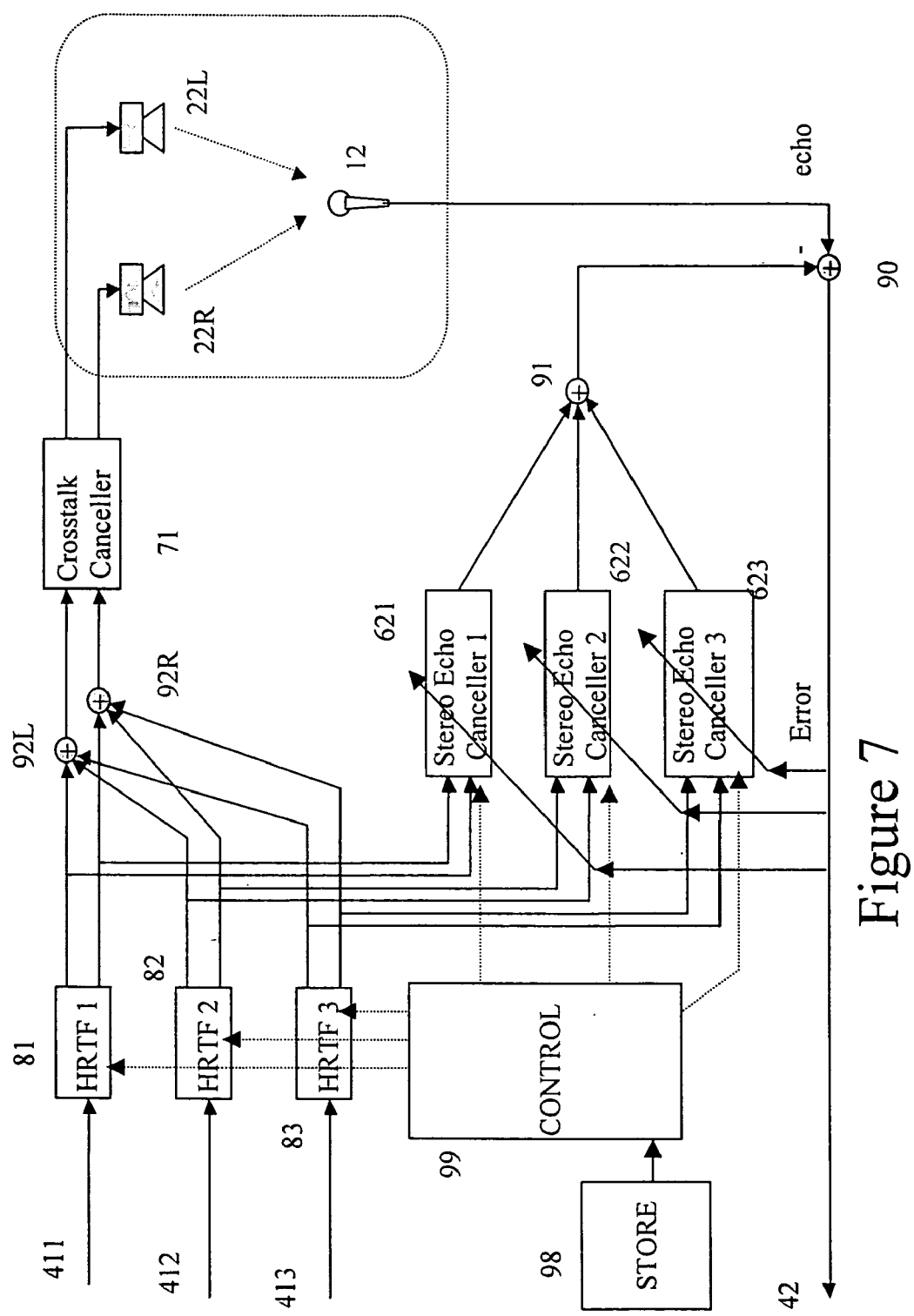
FIG. 7 is a schematic representation of a second echo cancellation system according to the invention.
Figure 8:
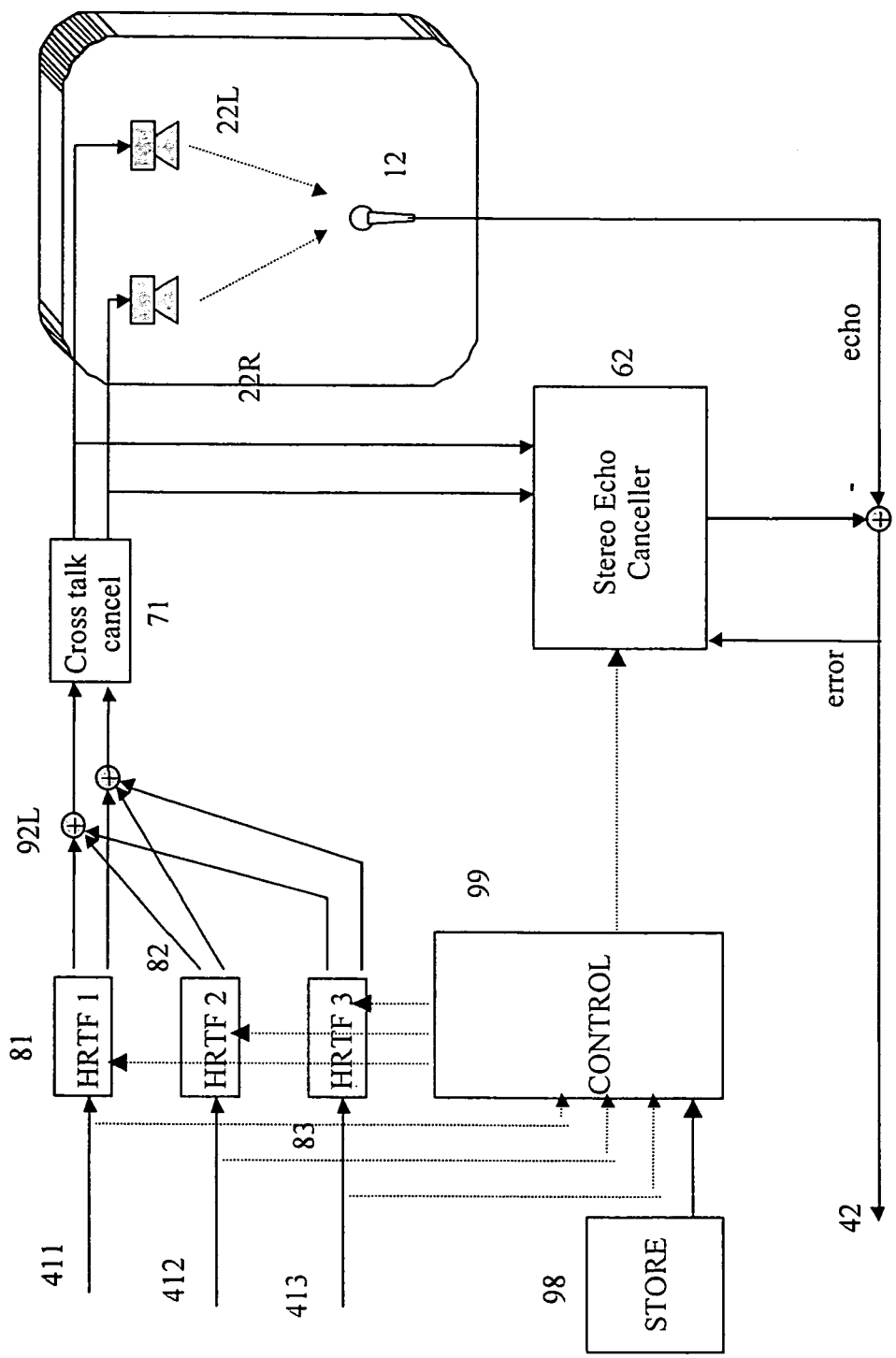
FIG. 8 is a schematic representation of a third echo cancellation system according to the invention.

The embodiments of FIGS. 6, 7 and 8 apply the principles of the invention to a transaural system—that is, one in which each incoming signal 411, 412, 413 is processed by a filter bank 81, 82, 83 with filter settings appropriate to allow two loudspeakers 22L, 22R to be used to reproduce the sound to be heard by the respective left and right ears of a listener. These settings are known as the "Head Related Transfer Function" (HRTF). Filtering 71 is used to eliminate crosstalk between left speaker and right ear, and vice versa. The principles can also be applied to panned stereo systems (in which the same mono signal is transmitted from both loudspeakers, with relative intensities selected to place the virtual sound source in the correct position) or ambisonic systems (in which two or more loudspeakers are controlled to reproduce the original sound field's wavefronts) by replacing the Head Related Transfer function filter banks (HRTFs) with appropriate scaling into the required number of channels.

The embodiment of FIG. 6 uses mono echo cancellers. Artificial transaural processing and ambisonic processing are both well-defined linear processes. A mono signal is transmitted on the return path 42, and mono signals are also received on each input channel 411, 412, 413, and placed in the ambisonic environment using appropriate predetermined Head Related Transfer Functions (HRTFs) for the filter banks 81, 82, 83 whose outputs are combined (92L, 92R) to provide the signals for the loudspeakers 22L, 22R. These filter values may be selected from a store 99 by a control system 98 according to the spatialisation required for the respective input signals 411, 412, 413. Echo control can be achieved with a mono echo canceller 621, 622, 623 for each input. Each canceller convolves the output signal 42 with its respective input signal 411, 412, 413, thereby identifying any correlations with that input, and generates a cancellation signal. The separate echo cancellation signals can then each be added in a combiner 91 to generate a cancellation signal which is in turn added to the return path 42 (combiner 90) to cancel that part of the echo attributable to each respective input channel.

In contrast to existing echo cancellers, the echo path now consists of the room response (the acoustic path between the loudspeakers 22L, 22R and the microphone 12) convolved with the HRTFs 81, 82, 83 and the crosstalk canceller 71. This approach allows established echo cancellation techniques to be used.

However, source locations in the ambisonic environment may change, for example to simulate the movement of one of the sound sources. Alternatively, if the number of available channels is less than the number of potential sound sources, one channel may be used by different sound sources, requiring different spatialisation, at different times in the same conference, as discussed in the applicant's co-pending application claiming priority from European Patent Application 98302763.2. Such changes to the ambisonic environment, and hence of the Head Related Transfer Functions used to define the filter banks 81, 82, 83, require re-adaptation of the echo cancellers. This disadvantage can be overcome using the system shown in FIG. 7.

In the embodiment of FIG. 7 stereo echo cancellers 621, 622, 623 are used, driven from the outputs, and not the inputs, of the respective HRTF filter banks 81, 82, 83. Correlations between the pairs of channels can be allowed for using the control processor 99, which modifies the parameters of the adaptation process used in the echo cancellors 621, 622, 623 according to the values of each HRTF. This system allows source locations to be changed without readapting. However, there is some redundancy in this system as all the stereo cancellers 621, 622, 623 should converge to the same values, because they are all modelling the same pair of paths 92L, 71, 22L, 12, 90 and 92R, 71, 22R, 12, 90.

With the embodiments of FIGS. 6 and 7, the echo canceller is modelling the crosstalk canceller 71, and one echo canceller is required for each input. These problems can be overcome using the system in FIG. 8. This uses a single stereo echo canceller 62 taking its input either downstream of the combiners 92L, 92R and crosstalk canceller 71. The adaptation of the stereo echo canceller will now be based either on features common to all the HRTFs used in the filter banks 81, 82, 83 or, as shown, using the controller 99 to determine input signal levels, speech content or other factors to select which of the predetermined HRTFs is the most appropriate to compensate for.

If steerable microphones or arrays are used, the number of possible 'channels' becomes the number of microphone directions, multiplied by the number of loudspeaker directions. This may be met by maintaining a set of echo canceller coefficients for each loudspeaker direction in the store 99, and selecting the appropriate coefficients for the currently selected direction.

What is claimed is:

1. A method of echo cancellation for an audio conferencing system in which a participant in the conference generates a monaural signal for transmission on an output channel to the other participants, and receives a monaural input channel from each of the other participants, the input channels being combined linearly to provide a spatialised audio output comprising a plurality of audio channels, characterised in that an adaptive filter process is applied to each of the input channels to generate a combined echo cancellation signal for applying to the output channel;

in which a separate adaptive filter is provided for each input channel, and the outputs of the filters are linearly combined to form the cancellation signal; and input signals carried by the input channels are individually converted to spatialised signal sets by respective filter banks having selected predetermined transfer functions, wherein the adaptive filters are multiple channel filters, and correlations between the spatialised signal sets are allowed for by an adaptation process driven by data selected according to the selected transfer functions.

2. A method of echo cancellation for an audio conferencing system according to claim 1 in which the method is applied to a transaural spatialisation system.

3. A method of echo cancellation for an audio conferencing system according to claim 1 in which the method is applied to a panned stereo spatialisation system.

4. A method of echo cancellation for an audio conferencing system according to claim 1 in which the method is applied to an ambisonic spatialisation system.

5. Echo cancellation apparatus for an audio conferencing system having a monaural output channel and a plurality of monaural input channels, the input channels being combined linearly to provide a spatialised audio output comprising a plurality of audio channels, characterised in that an adaptive filter is applied to each of the input channels for generating an echo cancellation signal for applying to the output channel;

in which a separate adaptive filter is provided for each input channel, and the outputs of the filters are connected to a linear combiner to form the cancellation signal; and the adaptive filters are multiple channel filters for operating on spatialised signal sets derived from respective input signals carried by the input channels according to respective predetermined transfer functions; and an adaptation processor driven by knowledge of each transfer function is provided for controlling the adaptive filters to allow for correlations between the spatialised signal sets.

6. An apparatus according to claim 5, wherein the apparatus is applied to a transaural spatialisation system.

7. An apparatus according to claim 5, wherein the apparatus is applied to a panned stereo system.

8. An apparatus according to claim 5, wherein the apparatus is applied to an ambisonic system.

9. A method of echo cancellation for an audio conferencing system, the method comprising:

generating a monaural signal for transmission on an output channel;

receiving respective signals on a plurality of independent monaural input channels;

linearly combining the signals received on the input channels to provide a spatialized audio output comprising a plurality of audio channels;

applying an adaptive filter process to all of the signals received on the input channels to generate a combined echo cancellation signal for applying to the output channel;

providing a separate adaptive filter for each input channel and linearly combining the outputs of the filters to form the echo cancellation signal; and individually converting the signals received on the input channels to spatialized signal sets by respective filter banks having selected predetermined transfer functions, wherein the adaptive filters are multiple channel filters, and correlations between the spatialized signal sets are allowed for by an adaptation process driven by data selected according to the selected transfer functions.

10. A method of echo cancellation for an audio conferencing system according to claim 9 in which the method is applied to a transaural spatialisation system.

11. A method of echo cancellation for an audio conferencing system according to claim 9 in which the method is applied to a panned stereo spatialisation system.

12. A method of echo cancellation for an audio conferencing system according to claim 9 in which the method is applied to an ambisonic spatialisation system.

13. An echo cancellation apparatus for an audio conferencing system, the apparatus comprising:

a monaural output channel;

a plurality of monaural input channels which are combined linearly to provide a spatialized audio output comprising a plurality of audio channels; and an adaptive filter which is applied to all of the input channels for generating an echo cancellation signal for applying to the output channel;

wherein a separate adaptive filter is operably coupled to each input channel, and the outputs of the filters are connected to a combiner to form the echo cancellation signal; and the adaptive filters are multiple channel filters for operating on spatialized signal sets derived from input signals carried by respective input channels according to respective predetermined transfer functions; and an adaptation processor driven by knowledge of each transfer function is provided for controlling the adaptive filters to allow for correlations between the spatialized signal sets.

14. The apparatus according to claim 13, wherein the apparatus is applied to a transaural spatialisation system.

15. The apparatus according to claim 13, wherein the apparatus is applied to a panned stereo system.

16. The apparatus according to claim 13, wherein the apparatus is applied to an ambisonic system.

* * * * *